United States Patent [19]

Barnsdale

[11] 4,307,986

[45] Dec. 29, 1981

[54] INSERTS

[76] Inventor: Arthur D. Barnsdale, "Alne Cote",, Great Alne, Near Alcester, Warwickshire, England

[21] Appl. No.: 78,956

[22] Filed: Sep. 26, 1979

[51] Int. Cl.³ .............................................. F16B 13/06
[52] U.S. Cl. .................................................... 411/41
[58] Field of Search .................. 85/72, 73, 74, 75, 76, 85/78, 77; 411/41, 40, 39, 43, 44, 57

[56] References Cited

U.S. PATENT DOCUMENTS

| | | | |
|---|---|---|---|
| 3,465,637 | 9/1969 | Cushman et al. | 85/74 X |
| 3,566,739 | 3/1971 | LeBar | 85/73 X |
| 4,002,099 | 1/1977 | Bradley et al. | 85/74 |
| 4,143,579 | 3/1979 | Ziaylek, Jr. | 85/72 |

FOREIGN PATENT DOCUMENTS

| | | | |
|---|---|---|---|
| 763704 | 7/1967 | Canada | 85/72 |
| 2622261 | 12/1977 | Fed. Rep. of Germany | 85/78 |
| 1082813 | 9/1967 | United Kingdom | 85/73 |
| 1158907 | 7/1969 | United Kingdom | 85/73 |
| 1236249 | 6/1971 | United Kingdom | 85/72 |

*Primary Examiner*—Ramon S. Britts

*Attorney, Agent, or Firm*—Watson, Cole, Grindle & Watson

[57] ABSTRACT

An insert for installation in a hole therefor in parent material comprises a ferrule which is longitudinally serrated externally so as to provide cutting teeth at its leading end and initially has a thin section connection at the leading end co-axially with a smaller diameter end of a body member of exterior taper form whereby on the body member being positioned for end location by its larger diameter end in a hole therefor and axial force is applied to the free other end of the ferrule, the thin section connection is first broken and the ferrule is then axially driven over the exterior taper form of the body member and expanded thereby to cause the cutting teeth at the leading end of the ferrule to shear material from the wall of the hole to a corresponding taper form and so lock the ferrule and body member in the hole against axial pull out. The exterior taper form of the body member has adjacent the thin section connection a peripheral portion of greater taper angle than that of a subsequent portion of the exterior taper form for initial rapid expansion of the leading end of the ferrule to initiate longitudinal splitting thereof and also to cause the cutting teeth to engage the wall of the hole.

3 Claims, 4 Drawing Figures

INSERTS

This invention relates to inserts for fixing, fastening or locating purposes wherein the insert is for installation in a hole therefor in parent material and is concerned with such an insert of the kind consisting of a body member at least part of which is of external taper form between larger and smaller diameter ends thereof and a radially expansible sleeve or ferrule adapted to be axially driven about the taper part of the body member when the latter is positioned by its larger diameter end in a hole therefor in parent material whereby the sleeve or ferrule is expanded to cause its leading end to shear material from the wall of the hole to a corresponding taper form in order to lock itself and the body member therein. Such inserts usually, but not necessarily, have a threaded bore for receiving a threaded member such as a screw and for example are for use in components of metal, plastics or other material or for similar use.

Inserts of this kind are set forth in the specifications of British Pat. Nos. 1,306,357 and 1,522,597 and the present invention relates in particular to inserts in accordance with the later patent, i.e. wherein a longitudinally serrated sleeve or ferrule initially has a thin section connection or junction at its leading end with the smaller diameter end of the body member which connection is first broken on the ferrule being axially driven over the external taper form of the body member.

The object of the present invention is to provide an improved insert of the above mentioned kind with a view to ensuring satisfactory installation especially where the insert is of hard material such as case hardened steel. Practical advantages in this and other respects are apparent from the following disclosure.

The accompanying drawings show a typical form of the insert on a considerably enlarged scale for clarity and in which.

Figure 1:
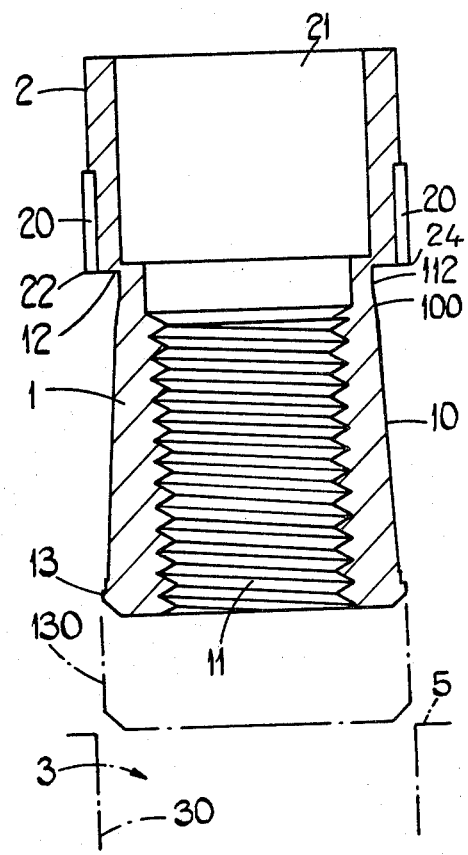
FIG. 1 is an axial plane section of the insert in its initial condition prior to installation.
Figure 2:
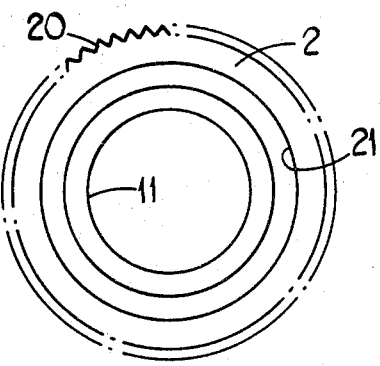
FIG. 2 is a plan view.

Any dimensions or similar values quoted herein are given by way of practical example only and may be varied according to requirements.

The insert is shown comprising a body member 1 and a sleeve or ferrule 2 which latter is initially integral with the body 1 by a thin section connection or junction 12. The insert body 1 is of external taper form at 10 and is shown provided with an internal threaded bore 11 for receiving a screw or similar threaded member or the bore may be plain for location or similar purposes.

The exterior of the ferrule 2 is longitudinally serrated at 20 and the internal bore 21 of the ferrule is shown of plain parallel form of a diameter substantially the same as the external diameter of the smaller end of the body 1. As referred to below the serrations 20 are shown extending for only part of the length of the ferrule 2 from the leading end thereof, e.g. for half the length or thereabouts, whilst the serrations may have some inclination from the straight longitudinal direction by having a slight spiral form.

In installing the insert it is placed body first in a hole 3 therefor of appropriate diameter in parent material 5 with its larger diameter end or base against or adjacent to the bottom or inner end of the hole 3 or otherwise end located in relation to the hole 3 (e.g. by a shoulder or by a stop pin or a support plate to a through hole 3 during installation). The depth of the hole 3 is such that the ferrule 2 in its initial condition integrally connected with the body 1 protrudes for a major part of its length out of the hole 3 above or beyond the surface of the parent material 5.

In accordance with one feature of this invention an exterior peripheral portion 100 near to the smaller rear end of the body 1 is of greater taper angle (e.g. of the order of 10°) compared with the subsequent taper angle (e.g. 5° or thereabouts) of the main taper part 10 of the body 1. These angles correspond to included taper angles of 20° and 10° respectively.

In the example shown the taper portion 100 is preceded by a parallel or cylindrical portion 112 next to the thin section connection 12.

Figure 3:
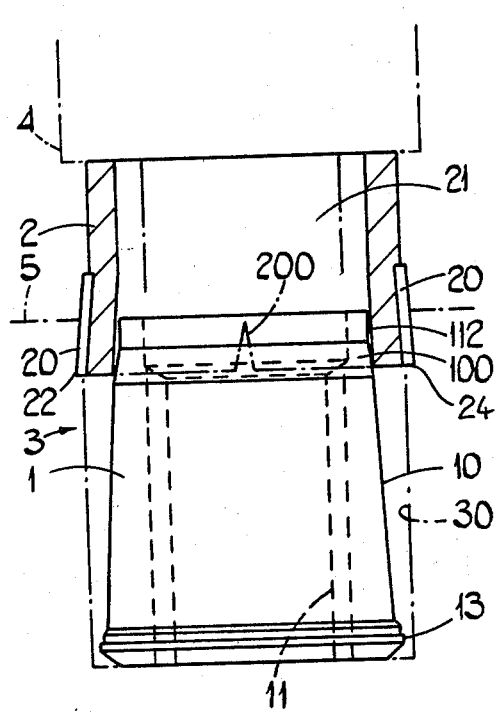
FIGS. 3 and 4 are section elevations respectively showing the insert at the commencement of installation and fully installed.

On the ferrule 2 and body 1 being subject to relative axial pressure such as by axial force applied to the ferrule, e.g. by an installation tool indicated at 4 (FIG. 3), the thin section connection 12 first breaks and the cylindrical parallel diameter portion 112 permits initial relative movement of the ferrule 2 and body 1 to facilitate such breaking of the thin section connection 12. On the leading end 22 of the ferrule 2 passing over the taper portion 100 it is subject to quite rapid expansion causing longitudinal splitting or cracking of the ferrule 2 as at 200 (FIG. 3,) i.e. at one or more indentations of the longitudinal serrations 20. By promoting early splitting of the ferrule 2 in this way, its subsequent axial movement and expansion over the main taper portion 10 of the body 1 is facilitated so that undue compression and possible collapse or bore distortion of the rear end of the body 1 is avoided or minimised.

In order to avoid this possibility the exterior serration 20 of the ferrule 2 only extends for part of the length of the ferrule 2 from the leading end 22 of the latter (where it provides cutting teeth 24) and in the example shown the extent of the longitudinal serrations 20 are about half the axial length of the ferrule 2. As the serrated ferrule 2 is first expanded (FIG. 3) the rear part of the serrations 20 tend to close together from expansion of the leading part in a convergent manner. Such tendency of the rear part of the serrations 20 to close together has the effect of restricting or opposing expansion of the ferrule 2 thereby increasing compression loading on the rear part of the body 1 which again may lead to collapse of the latter or undesired distortion of the bore for the purpose of subsequently receiving a screw. The longer the serrations the greater is the undesired effect obtained in this way.

However by reducing the length of the serrations 20 to that shown, the closing together at their rear ends is reduced so that restriction on the expansion of the ferrule 2 is minimised and likewise any adverse effect on the body 1. As a result of the more or less immediate splitting of the ferrule 2 promoted by the taper portion 100 and the reduced restriction against expansion permitted by the serrations 20 of shorter length, the ferrule 2 is more easily driven fully over the body 1 without damage to the latter and also requires less installation force. At the same time the cutting teeth 24 at the leading end 22 of the ferrule 2 are thrust outwardly into biting engagement with the bore wall 30 of a hole 3 in parent material 5 receiving the insert.

Figure 4:
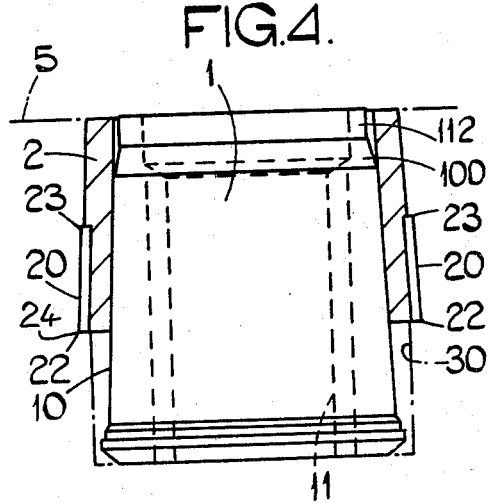

As the ferrule 2 is driven into position in this way further splitting of the ferrule 2 occurs and the cutting teeth at the leading end 22 shear material from the wall 30 of the hole 3 so that the wall 30 is formed to a corresponding taper form (FIG. 4) in order to lock the ferrule 2 and body 1 in the hole 3 against axial pull-out.

Once fully installed a further advantage arising from the construction of insert in accordance with this invention is that the rear ends 23 of the short serrations 20 also provide teeth which tend to dig into the bore wall 30 and thus restrain back-out movement of the ferrule 2 from the hole 3, i.e. on the screw being tightened in the bore 21 of the body 1 and which tends to cause back or pull-up movement of the body 1 into the ferrule 2.

Material sheared away from the wall 30 of the hole 3 by the ferrule 2 is accommodated between the leading end 22 of the latter and a shouldered land or rib 13 about the leading end of the body 1 where it is of widest diameter. This land 13 may be of relatively narrow form or of extended axial length as indicated at 130 in FIG. 1.

I claim:

1. An insert of the character described for installation in a hole therefore in parent material comprising a round section body member having an axial bore therein, at least part of the exterior of said body member being of co-axial taper form between a smaller diameter end and a larger diameter end thereof, a peripheral portion of the exterior taper form adjacent the smaller diameter end being of greater taper angle but of considerably shorter axial extent than that of a subsequent portion of the exterior taper form, said body member being such as to end locate by its larger diameter end in a hole therefore in parent material; and a tubular ferrule which is externally serrated with a plurality of serrations in a substantially longitudinal direction so as to provide a series of external cutting teeth at and about the leading end of the ferrule, said ferrule having an internal axial bore which is initially uninterrupted and of substantially the same diameter as the smaller diameter end of the body member, the ferrule also initially having a thin section connection at the interior of its leading end with the smaller diameter end of the body member and co-axial therewith, whereby on the body member being positioned for end location by its larger diameter end in a hole therefore in parent material and axial force is applied to the free other end of the ferrule, the thin section connection is first broken and the ferrule is then initially axially driven over the peripheral portion of greater taper angle of the exterior taper form for rapid expansion thereby just sufficient to initiate longitudinal splitting of the ferrule and also effect engagement of the cutting teeth of the leading end of the ferrule with the wall of a hole receiving the insert, continued axial movement of the ferrule and further expansion thereof over the subsequent portion of less taper angle and longer axial extent of the exterior taper form causing the cutting teeth to shear material from the wall of the hole to a corresponding taper form and so lock the ferrule and body member in the hole against axial pull-out.

2. An insert according to claim 1 wherein there is interposed between said thin section connection and said peripheral portion of greater taper angle, a parallel diameter portion also of short axial extent for permitting initial relative axial movement of the ferrule and body member to enable breakage of the thin section connection to take place immediately prior to contact of the leading end of the ferrule with the peripheral portion of greater taper angle.

3. An insert according to claim 1 wherein the external serrations of the ferrule only extend for part of the axial length of the latter from the leading end thereof in order to minimise closing together of the serrations on expansion of the ferrule by the exterior taper form of the body member.

* * * * *

UNITED STATES PATENT OFFICE
CERTIFICATE OF CORRECTION

PATENT NO. : 4,307,986
DATED : December 29, 1981
INVENTOR(S) : ARTHUR D. BARNSDALE It is certified that error appears in the above—identified patent and that said Letters Patent are hereby corrected as shown below:

In the title page insert

--FOREIGN APPLICATION PRIORITY DATA

January 31, 1979
United Kingdom
03396/79--

Signed and Sealed this

Nineteenth Day of April 1983

[SEAL]

Attest:

Attesting Officer

GERALD J. MOSSINGHOFF

Commissioner of Patents and Trademarks